(12) United States Patent
Masui et al.

(10) Patent No.: US 10,486,698 B2
(45) Date of Patent: Nov. 26, 2019

(54) VEHICLE CRUISE CONTROL DEVICE AND CRUISE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Toyoharu Katsukura, Kariya (JP); Yoshihisa Ogata, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 98 days.

(21) Appl. No.: 15/544,847

(22) PCT Filed: Jan. 15, 2016

(86) PCT No.: PCT/JP2016/051122
§ 371 (c)(1),
(2) Date: Jul. 19, 2017

(87) PCT Pub. No.: WO2016/117468
PCT Pub. Date: Jul. 28, 2016

(65) Prior Publication Data
US 2018/0009438 A1    Jan. 11, 2018

(30) Foreign Application Priority Data
Jan. 21, 2015 (JP) .................. 2015-009774

(51) Int. Cl.
| | | |
|---|---|---|
| *B60W 30/16* | (2012.01) | |
| *B60W 30/14* | (2006.01) | |
| *G08G 1/16* | (2006.01) | |

(52) U.S. Cl.
CPC ............ *B60W 30/16* (2013.01); *B60W 30/14* (2013.01); *G08G 1/16* (2013.01); *G08G 1/166* (2013.01);
(Continued)

(58) Field of Classification Search
CPC ................ B60W 30/16; B60W 30/14; B60W 2550/146; B60W 2550/306; G08G 1/16; G08G 1/166
See application file for complete search history.

(56) References Cited

U.S. PATENT DOCUMENTS 6,230,093 B1 * 5/2001 Michi .................. G01S 13/931
                                                       180/167
6,853,906 B1 * 2/2005 Michi ................ B60K 31/0008
                                                       701/410
(Continued)

FOREIGN PATENT DOCUMENTS

CN    202174990 U    3/2012
CN    203543948 U    4/2014
(Continued)

*Primary Examiner* — Courtney D Heinle
(74) *Attorney, Agent, or Firm* — Knobbe, Martens, Olson & Bear, LLP

(57) ABSTRACT

A cruise control device 10 includes a cutting-in/deviation determination unit 12 for performing cutting-in determination and deviation determination of another vehicle. The cutting-in/deviation determination unit 12 calculates a lateral position that is a position in a vehicle width direction of a forward vehicle 51 traveling ahead of an own vehicle 50, and determines the forward vehicle 51 traveling on an adjacent lane 64 to be a cutting-in vehicle into an own lane 63 and determines the forward vehicle 51 traveling on the (Continued)

own lane 63 to be a deviating vehicle from the own lane 63 on the basis of the calculated lateral position. The cutting-in/deviation determination unit 12 determines whether or not the own vehicle 50 is in a predetermined own vehicle turning state that is either one of a state before starting a turn or a state of turning, and determines permission of performing of cutting-in determination and deviation determination of the other vehicle on the basis of the determination result.

8 Claims, 4 Drawing Sheets

(52) U.S. Cl.
CPC . *B60W 2550/146* (2013.01); *B60W 2550/306* (2013.01)

(56) References Cited

U.S. PATENT DOCUMENTS

| | | | | |
|---|---|---|---|---|
| 2001/0037165 A1* | 11/2001 | Shirai | ................... | B60W 30/16 701/1 |
| 2002/0032514 A1* | 3/2002 | Kuroda | .............. | B60K 31/0008 701/96 |
| 2002/0103600 A1* | 8/2002 | Hirao | ................... | G01S 17/936 701/301 |
| 2004/0098196 A1* | 5/2004 | Sekiguchi | .......... | B60K 31/0008 701/301 |
| 2005/0228588 A1* | 10/2005 | Braeuchle | ........... | B60W 30/095 701/301 |
| 2007/0027597 A1* | 2/2007 | Breuel | ............... | B60K 31/0008 701/41 |
| 2009/0164082 A1* | 6/2009 | Kobayashi | ......... | B60K 31/0008 701/94 |
| 2012/0130595 A1* | 5/2012 | Hayakawa | ............ | B60W 30/12 701/42 |
| 2013/0211689 A1* | 8/2013 | Mizutani | ................ | B60K 31/00 701/96 |
| 2014/0136015 A1* | 5/2014 | Hayakawa | ................ | B60T 7/22 701/1 |
| 2015/0100228 A1* | 4/2015 | Sudou | ....................... | G01S 1/02 701/300 |
| 2015/0166063 A1* | 6/2015 | Ishihara | ............... | B62D 15/025 701/41 |
| 2015/0175001 A1* | 6/2015 | Okuda | .................... | B60R 16/02 701/34.4 |
| 2015/0294571 A1* | 10/2015 | Shida | ..................... | G08G 1/161 701/409 |
| 2015/0307100 A1* | 10/2015 | Shimizu | ................... | B60T 7/22 701/96 |
| 2015/0321699 A1* | 11/2015 | Rebhan | ................... | B60Q 9/00 701/23 |
| 2015/0375744 A1* | 12/2015 | Kato | ..................... | B60W 30/16 701/96 |

FOREIGN PATENT DOCUMENTS

| | | |
|---|---|---|
| JP | 2007-176483 A | 7/2007 |
| JP | 2007-331608 A | 12/2007 |

* cited by examiner

VEHICLE CRUISE CONTROL DEVICE AND CRUISE CONTROL METHOD

CROSS-REFERENCE TO RELATED APPLICATION

This application is based on and claims the benefit of priority from earlier Japanese Patent Application No. 2015-009774 filed on Jan. 21, 2015 the descriptions of which is incorporated herein by reference.

TECHNICAL FIELD

This disclosure relates to a vehicle traveling control technique.

BACKGROUND ART

As a vehicle traveling support control, a vehicle-following control by which an own vehicle travels by following a selected preceding vehicle is known. The preceding vehicle is selected from vehicles traveling on an own lane which is the same lane as that of the own vehicle. In such vehicle-following control, it is important to accurately select a vehicle traveling on the own lane from vehicles detected by, for example, a distance measurement sensor, a vehicle-mounted camera or the like. Conventionally, a process is performed in such a manner that a predicted route that is a future traveling route of an own vehicle is calculated, and a vehicle that is present on the calculated predicted route is used as a target of a vehicle-following control. For example, PTL 1 discloses the following technique as a method for selecting a preceding vehicle that is a vehicle-following control target. In the technique of PTL 1, a turning circle computed on the basis of a yaw rate and a vehicle speed is used as a predicted route on which an own vehicle proceeds. Furthermore, the technique of PTL 1 calculates, in accordance with an offset distance at a lateral position that is a position in a lateral direction between a path of the own vehicle and a forward vehicle, an own lane probability that is a probability that a forward vehicle is present in an own lane. As a result, the technique of PTL 1 selects a predefined vehicle to follow in accordance with the calculated own lane probability.

PTL 2 discloses the following technique. The technique of PTL 2 calculates a lateral moving speed that is a moving speed in a lane lateral direction of a forward vehicle in order to start early switching of a preceding vehicle. Furthermore, the technique of PTL 2 calculates a predicted lateral position that is a lateral position of the forward vehicle predicted in accordance with the calculated lateral moving speed, and selects a preceding vehicle to follow on the basis of the calculated predicted lateral position.

CITATION LIST

Patent Literature

[PTL 1] JP 2007-331608 A
[PTL 2] JP 2007-176483 A

SUMMARY OF THE INVENTION

Technical Problem

Under a situation such as when an own vehicle changes lane or is traveling on the own lane unsteadily or is about to reach a curved road, an offset distance at a position with respect to the own vehicle in a lateral direction of a forward vehicle (lateral position) changes. In this case, for example, under a situation where a turning angle of the own vehicle is large, there are times when the forward vehicle crosses over a vehicle center axis of the own vehicle, and the forward vehicle approaches the vehicle center axis of the own vehicle or moves away from the vehicle center axis. In such a case, it is considered that a preceding vehicle of a vehicle-following control object is erroneously determined to be a deviating vehicle. In addition, there is a risk that a forward vehicle traveling on an adjacent lane adjacent to the own lane is erroneously determined to be a cutting-in vehicle, and that this vehicle is erroneously selected as a preceding vehicle as target of a vehicle-following process.

It is an object of this disclosure to provide a vehicle cruise control technique that can improve stability of selection/non-selection of a preceding vehicle.

Solution to Problem

The cruise control device of this disclosure employs the following means.

The present invention relates to a vehicle cruise control device. The cruise control device of this disclosure is provided with a lateral position calculating means calculating a lateral position that is a position in a vehicle width direction of a forward vehicle traveling ahead of an own vehicle, a vehicle determination means performing cutting-in determination and deviation determination of another vehicle, in which with regard to the forward vehicle, it is determined whether the forward vehicle traveling on an adjacent lane adjacent to an own lane that is the travel lane of the own vehicle is a cutting-in vehicle that cuts into the own lane, and determined whether the forward vehicle traveling on the own lane is a deviating vehicle that deviates from the own lane on the basis of the lateral position calculated by the lateral position calculating means, a turn determination means determining whether or not the own vehicle is in a predetermined own vehicle turning state that is either one of a state before starting a turn or a state of turning, and a permission determining means determining permission of performing of cutting-in determination and deviation determination of the other vehicle on the basis of a determination result by the turn determination means.

When the own vehicle is in a state of turning, if cutting-in determination and deviation determination of another vehicle based on a position in a vehicle width direction (lateral direction) of a forward vehicle are performed, there is a risk that movement of the forward vehicle with respect to the own vehicle cannot be accurately recognized. In such a case, it is considered that the forward vehicle is erroneously determined to correspond to a cutting-in vehicle or a deviating vehicle. In addition, also with regard to a case where the own vehicle is in a state before starting a turn, there is a risk that the movement of the forward vehicle with respect to the own vehicle cannot be accurately recognized, and there is concern similar to the abovementioned case. In view of this, the cruise control device of this disclosure is configured so as to determine permission of performing of cutting-in determination and deviation determination of the other vehicle on the basis of a determination result of whether or not an own vehicle is in a predetermined own vehicle turning state that is either one of a state before starting a turn or a state of turning. By this configuration, the cruise control device of this disclosure can improve stability of selection/non-selection of a preceding vehicle that is to be a target of a vehicle-following control.

DESCRIPTION OF THE EMBODIMENTS

Hereinafter, an embodiment of a vehicle cruise control device will be described with reference to the drawings. The cruise control device according to this embodiment is mounted in a vehicle, and performs a vehicle-following control by which an own vehicle travels by following a preceding vehicle traveling on an own lane which is the same lane as that of the own vehicle among forward vehicles traveling ahead of the own vehicle. In the vehicle-following control according to this embodiment, a following distance between the own vehicle and the preceding vehicle is controlled. First, a schematic configuration of the cruise control device according to this embodiment will be described with the use of FIG. 1.

Figure 1:
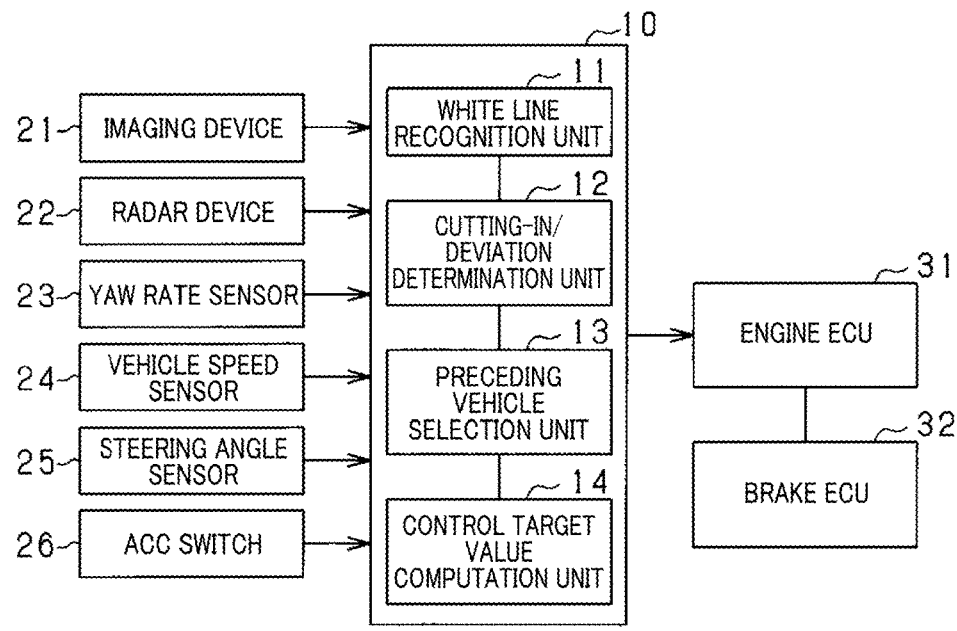
FIG. 1 is a block diagram illustrating a schematic configuration of a vehicle cruise control device.

In FIG. 1, a cruise control device 10 according to this embodiment is a computer provided with a CPU, a ROM, a RAM, an I/O and the like. The cruise control device 10 includes a white line recognition unit 11, a cutting-in/deviation determination unit 12, a preceding vehicle selection unit 13 and a control target value computation unit 14. The cruise control device 10 implements the abovementioned functions by the CPU executing a program installed in the ROM. In the vehicle (own vehicle) in which the cruise control device 10 is mounted, an object detection means detecting an object that is present in the surroundings of the vehicle is mounted. In addition, in this embodiment, an imaging device 21 and a radar device 22 are mounted as the object detecting means. When information on an object detected is input from the object detecting means, the cruise control device 10 performs a vehicle-following control relative to the preceding vehicle on the basis of the input information.

The imaging device 21 is a vehicle-mounted camera and is composed of a CCD camera, a CMOS sensor, a near-infrared camera and the like. The imaging device 21 images a surrounding environment of the own vehicle (the surroundings of the vehicle) including a traveling road, and generates image data of the captured image. The imaging device 21 sequentially outputs the generated image data to the cruise control device 10. The imaging device 21 is installed, for example, in the vicinity of an upper side of a windshield of the own vehicle, and images a region that extends in front of the vehicle centering around an imaging axis in a range with a predetermined angle $\delta1$ (detectable region of the imaging device 21). In addition, the imaging device 21 may be a monocular camera or a stereo camera.

The radar device 22 is a scanning device that transmits, for example, electromagnetic waves as transmission waves and detects an object by receiving reflected waves of the transmission waves. In addition, in this embodiment, the radar device 22 is composed of a millimeter wave radar. The radar device 22 is attached to the front of the own vehicle, and scans a region (detectable region of the radar device 22) that extends in front of the vehicle centering around a light axis in a range with a predetermined radar angle $\delta2$ ($\delta2<\delta1$) using a radar signal. The radar device 22 generates distance measurement data of the detected object on the basis of a time from transmitting the electromagnetic waves toward the front side of the vehicle until receiving the reflected waves. The radar device 22 sequentially outputs the generated distance measurement data to the cruise control device 10. The distance measurement data contains information regarding a direction where the object is present with respect to the own vehicle, a distance from the own vehicle to the object and relative velocity of the object with respect to the own vehicle.

In the imaging device 21 and radar device 22, the imaging axis that is a reference axis of the imaging device 21 and the light axis that is a reference axis of the radar device 22 are attached so as to be in a direction which is the same as a direction parallel to a traveling road surface of a traveling road of the own vehicle. A detectable region of the imaging device 21 and a detectable region of the radar device 22 partially overlap with each other.

The cruise control device 10 receives inputs of the image data from the imaging device 21 and the distance measurement data from the radar device 22. In addition, the cruise control device 10 receives inputs of detection signals of other various types of sensors provided in the vehicle. As the other various types of sensors, a yaw rate sensor 23, a vehicle speed sensor 24, a steering angle sensor 25, and an ACC switch 26 and the like are provided. The yaw rate sensor 23 detects angular velocity (yaw rate) with respect to a turning direction of the vehicle. The vehicle speed sensor 24 detects a vehicle speed of the vehicle. The steering angle sensor 25 detects a steering angle of the vehicle. The ACC switch 26 is an input switch for selecting permission of performing a vehicle-following control mode.

The cruise control device 10 has the white line recognition unit 11, the cutting-in/deviation determination unit 12, the preceding vehicle selection unit 13 and the control target value computation unit 14. The white line recognition unit 11 functions as a boundary recognition means recognizing a white line on a road surface as a lane boundary that defines an own lane which is the travel lane of the own vehicle. In this embodiment, the white line is recognized in the following manner. The white line recognition unit 11 receives inputs of the image data from the imaging device 21, and extracts edge points as candidates white lines from the input image data on the basis of a rate of change or the like of luminance in a lateral direction of the input image. The white line recognition unit 11 sequentially stores the extracted edge point for every frame, and recognizes a white line on the basis of a record of the stored edge points. The white line recognition unit 11 stores the recognition result as white line information (information of recognized lane boundary).

The cutting-in/deviation determination unit 12 functions as a vehicle determination means which detects a cutting-in vehicle that cuts into the own lane that is the travel lane of the own vehicle and a deviating vehicle which deviates from the own lane from among the objects detected by the object detecting means. In short, the cutting-in/deviation determination unit 12 corresponds to a cutting-in determination function and a deviation determination function related to another vehicle. In the following description, as a matter of convenience, an object detected by the object detecting means is also referred to as a "target". The cutting-in/deviation determination unit 12 first functions as a lateral position calculating means calculating a relative position (lateral position) with respect to the own vehicle in a vehicle width direction (lateral direction) of a forward vehicle. Furthermore, the cutting-in/deviation determination unit 12 performs cutting-in determination function and deviation determination of the other vehicle on the basis of the calculated relative position. An offset position (hereinafter, referred to as "offset position in the lateral direction", which corresponds to "a lateral position that is a position of a vehicle width direction of a vehicle") that is a position coordinate with respect to the own vehicle in an X-axis direction of the forward vehicle is calculated on the basis of an orthogonal coordinate system in which the vehicle width direction (lateral direction) of a vehicle is used as an X-axis and a travelling direction of the vehicle is used as a Y-axis. With regard to the offset position in the lateral direction of the forward vehicle, for example, the offset position is calculated by correcting a position coordinate in the vehicle width direction (lateral direction) detected by the imaging device 21 on the basis of an estimated R that is a curve radius of a predicted route (curve) in the own vehicle. In addition, in this embodiment, a center position in a lateral direction of a target with respect to the own vehicle is used as an offset position in the lateral direction of the forward vehicle (lateral position).

The cutting-in/deviation determination unit 12 performs, as the cutting-in determination and deviation determination process of another vehicle, cutting-in determination and deviation determination of the other vehicle on the basis of the calculated offset position (the offset position in the lateral direction of the forward vehicle) and a lateral moving speed (moving speed toward the lateral direction of the forward vehicle) represented by a time derivative of the offset position. In addition, in this embodiment, the right side with respect to a travelling direction of the own vehicle is set to be positive and the left side is set to be negative.

Figure 2:
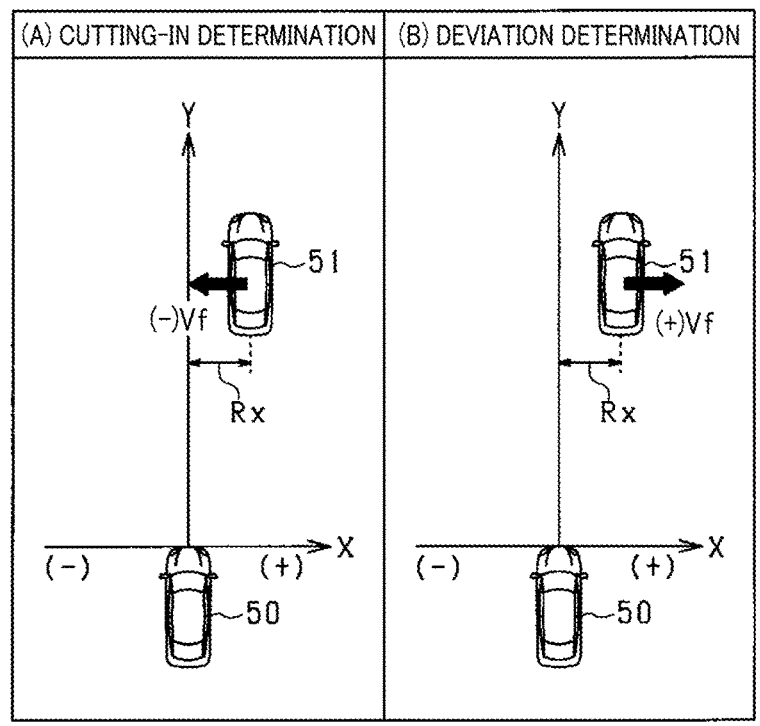
FIG. 2 is an explanatory diagram of cutting-in determination and deviation determination of another vehicle.

As illustrated in FIG. 2 (A), the cutting-in/deviation determination unit 12 determines that a forward vehicle 51 is a cutting-in vehicle relative to an own vehicle 50 when a sign of an offset position Rx in a lateral direction of the forward vehicle 51 and a sign of a lateral moving speed Vf of the forward vehicle 51 are different from each other and the lateral moving speed Vf is a threshold value or above and the offset position Rx is smaller than a threshold value. In addition, as illustrated in FIG. 2 (B), the cutting-in/deviation determination unit 12 determines that the forward vehicle 51 is a deviating vehicle relative to the own vehicle 50 when the sign of the offset position Rx in the lateral direction of the forward vehicle 51 and the sign of the lateral moving speed Vf of the forward vehicle 51 are the same, and the lateral moving speed Vf is a threshold value or above and the offset position Rx is a threshold value or greater.

The cutting-in/deviation determination unit 12 according to this embodiment performs fusion of the data of a target detected by the imaging device 21 and a target detected by the radar device 22 which belong to an identical object (image data and distance measurement data that contain a target which belong to an identical object). The cutting-in/deviation determination unit 12 determines the presence or absence of the forward vehicle 51, targeting a target (fusion target) obtained by the fusion of data. When determining that there is a forward vehicle, the cutting-in/deviation determination unit 12 performs cutting-in determination and deviation determination of another vehicle. As one example of the fusion of data, with regard to image data and distance measurement data, a plurality of detecting points that are present in a predetermined fusion range are fused as data belonging to an identical object. When the target detected by the imaging device 21 and the target detected by the radar device 22 are in a predetermined positional relationship, the fusion of data is performed on the supposition that image data and distance measurement data for the detected target belong to an identical object. Note that the method for fusing data is not limited to this.

The preceding vehicle selection unit 13 selects/deselects a preceding vehicle that is to be a target of a vehicle-following control from the objects detected by the object detecting means on the basis of the determination result of the cutting-in/deviation of the other vehicle by the cutting-in/deviation determination unit 12. In the cruise control device 10 according to this embodiment, a basic map in which an own lane probability is defined indicating a probability that the forward vehicle 51 is present on the own lane that is the travel lane of the own vehicle 50 is preliminarily stored in accordance with an offset position of the forward vehicle 51 in a lateral direction Rx. In short, the cruise control device 10 stores map data in which an offset position in the lateral direction Rx of the forward vehicle 51 and the own lane probability are preliminarily associated with each other in a predetermined storage area (for example, a memory, etc.). The preceding vehicle selection unit 13 reads the own lane probability corresponding to the offset position in the lateral direction Rx of the forward vehicle 51 from the data of the basic map, and corrects the own lane probability in accordance with the determination result of the cutting-in/deviation determination unit 12. The preceding vehicle selection unit 13 selects a forward vehicle 51 in which the corrected own lane probability is a predetermined value or higher as a preceding vehicle of the vehicle-following control object. Otherwise, with regard to a forward vehicle 51 in which the own lane probability is a predetermined value or lower, the selection as the preceding vehicle of the vehicle-following control object is cleared.

The cruise control device 10 according to this embodiment controls a vehicle speed (running speed) of the own vehicle 50 in order to keep a following distance between a preceding vehicle selected by the preceding vehicle selection unit 13 and the own vehicle 50 at a target interval set in advance. The control target value computation unit 14 calculates a control target value for performing such vehicle speed control. In particular, the control target value computation unit 14 calculates a target output, a required braking force and the like of an in-vehicle engine, and outputs the calculated control value to the engine electronic control unit (engine ECU 31) as a control signal. The cruise control device 10 according to this embodiment is configured so as to output the control signal to the engine ECU 31, which in turn outputs the control signal to the brake electronic control unit (brake ECU 32). Note that the output configuration of the control signal is not limited to this. For example, the cruise control device 10 may be configured so as to output the control signal to each of the engine ECU 31 and the brake ECU 32.

Here, when the own vehicle 50 changes lane, or is unsteadily traveling in the own lane in a right and left direction, the offset position Rx with respect to the own vehicle 50 in the lateral direction of the forward vehicle 51 changes. Under the circumstances, a probability of erroneous determination regarding the cutting-in and deviation of the forward vehicle 51 becomes higher. Therefore, under the circumstances, there is concern that a selection failure or a selection mistake of a preceding vehicle occurs. In addition, when there is a curved road ahead of the own vehicle 50, a problem tends to occur such that a cutting-in vehicle and a deviating vehicle cannot be properly determined.

Figure 3A:
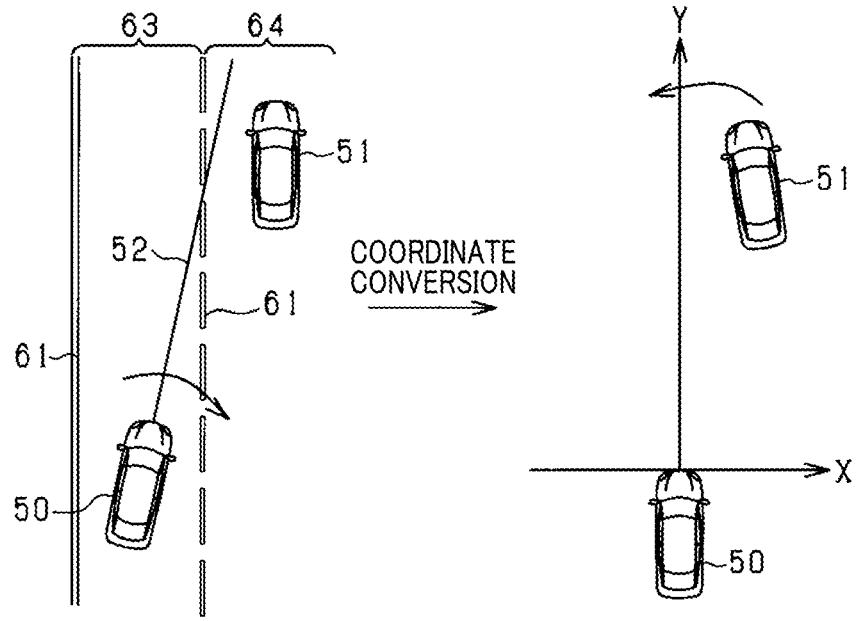
FIG. 3A is a diagram illustrating lane change of an own vehicle.
Figure 3B:
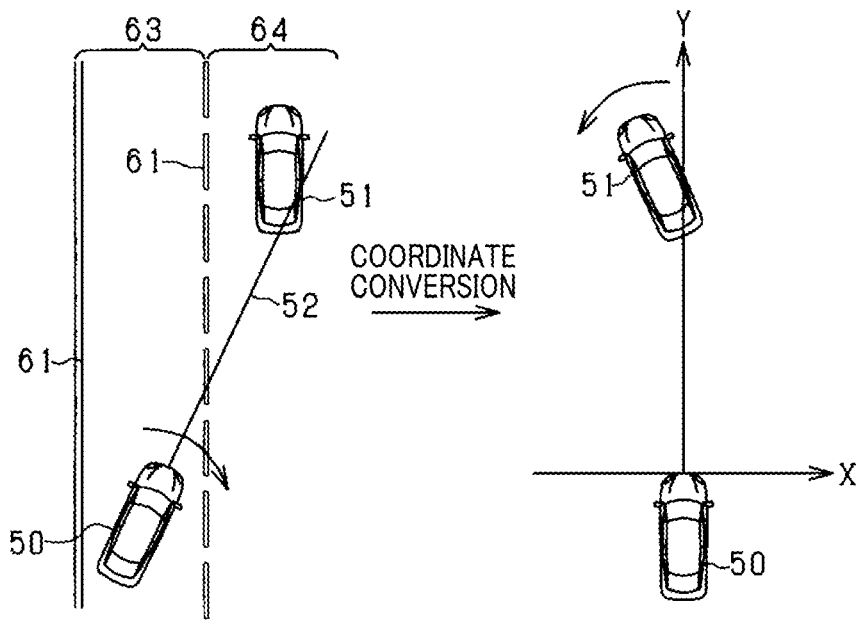
FIG. 3B is another diagram illustrating lane change of an own vehicle.

FIG. 3 is a diagram illustrating a case where the own vehicle 50 changes lane from an own lane 63 to an adjacent lane 64 that is adjacent to the own lane while traveling on a straight road. FIG. 3A illustrates a case where the own vehicle 50 changes lane at a small turning angle (slightly inclined angle) with respect to a white line 61. On the other hand, FIG. 3B illustrates a case where the own vehicle 50 changes lane at a large turning angle (largely inclined angle). In addition, FIG. 3 illustrates a case where a spatial coordinate on a traveling road in which the own vehicle 50 and the forward vehicle 51 are positioned is converted to an orthogonal coordinate system with respect to the own vehicle 50, in which a vehicle width direction (lateral direction) of a vehicle is used as an X-axis and a travelling direction of the vehicle is used as a Y-axis.

When the own vehicle 50 changes lane, it appears that the forward vehicle 51 interrupts relatively. For example, in the case of FIG. 3A, the own vehicle 50 is about to cut into rearward of the forward vehicle 51 along with the turning operation of the own vehicle 50 when changing a lane. However, in such a case, it appears that as if the forward vehicle 51 traveling on the adjacent lane 64 interrupts in front of the own vehicle 50. In this case, when the own vehicle 50 changes the lane slowly at a small turning angle with respect to the white line 61, the forward vehicle 51 does not cross over a vehicle center axis 52 of the own vehicle 50 as illustrated in FIG. 3A. Therefore, in such a case, cutting-in determination is performed relative to the forward vehicle 51 and an erroneous determination problem does not occur.

On the other hand, when the own vehicle 50 abruptly changes lane at a large turning angle with respect to the white line 61, there are times when the forward vehicle 51 crosses over the vehicle center axis 52 of the own vehicle 50 as illustrated in FIG. 3B. In such a case, deviation determination is performed on the forward vehicle 51 that should be a preceding vehicle after the lane change, and it is considered that accuracy of selection/non-selection of a preceding vehicle that is to be a target of a vehicle-following control is degraded.

Figure 4A:
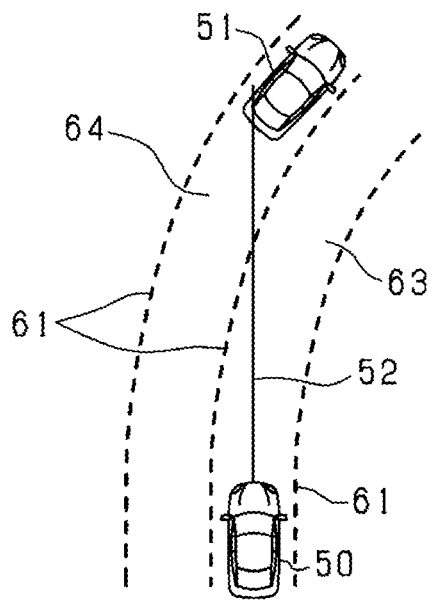
FIG. 4A is a diagram illustrating a situation where the own vehicle is traveling on a curve entry road.

In a case where the own vehicle 50 is about to enter a curved road (while the own vehicle 50 is traveling a curve entry road that is a straight road of a predetermined section before a curved road), when cutting-in determination and deviation determination of another vehicle are performed, it is considered that an erroneous determination is caused. In particular, when the own vehicle 50 is about to reach a curved road, the forward vehicle 51 is travelling on the curved road, whereas the own vehicle 50 is still traveling on a straight road (curve entry road) as illustrated in FIG. 4A. Therefore, it appears from the own vehicle 50 traveling on the own lane 63 before the curved road that as if the forward vehicle 51 traveling on the adjacent lane 64 that is an outside curved road cuts into the own lane 63. In such a case, it is considered that, the forward vehicle 51 is erroneously determined to be a preceding vehicle of a vehicle-following control object regardless of actually being the forward vehicle 51 traveling on the adjacent lane 64.

Figure 4B:
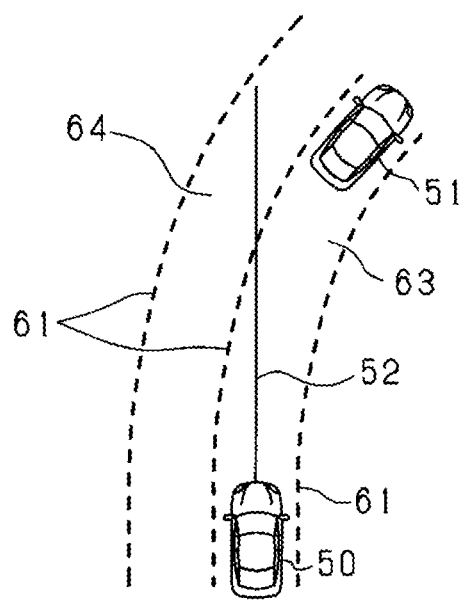
FIG. 4B is another diagram illustrating a situation where the own vehicle is traveling on a curve entry road.

On the other hand, while the forward vehicle 51 travels on a lane same as the own lane 63, when the own vehicle 50 is about to enter a curved road, it appears that the forward vehicle 51 moves with respect to the own vehicle 50 in a lateral direction as illustrated in FIG. 4B. In such a case, there is a risk that the forward vehicle 51 is erroneously determined to be a deviating vehicle. In addition, when the own vehicle 50 travels on a curved road, there are times when route prediction accuracy of the own vehicle 50 is degraded depending on a shape of the road, and it is considered that accuracy in the determination of a cutting-in vehicle and a deviating vehicle is thereby degraded.

Accordingly, the cruise control device 10 according to this embodiment determines permission of performing of cutting-in determination and deviation determination of another vehicle (execution permission of a determination process) on the basis of a turning state of the own vehicle 50. In particular, the cutting-in/deviation determination unit 12 provided in the cruise control device 10 according to this embodiment functions as a turn determination means determining whether or not the own vehicle in a predetermined own vehicle turning state that is either one of a state before starting a turn or a state of turning. Furthermore, the cutting-in/deviation determination unit 12 functions as a permission determining means determines permission of performing of cutting-in determination and deviation determination of the other vehicle on the basis of the determination result. As a result, when determining that the own vehicle 50 is in the predetermined own vehicle turning state, the cutting-in/deviation determination unit 12 forbids the performing of the cutting-in determination and deviation determination of the other vehicle.

Figure 5:
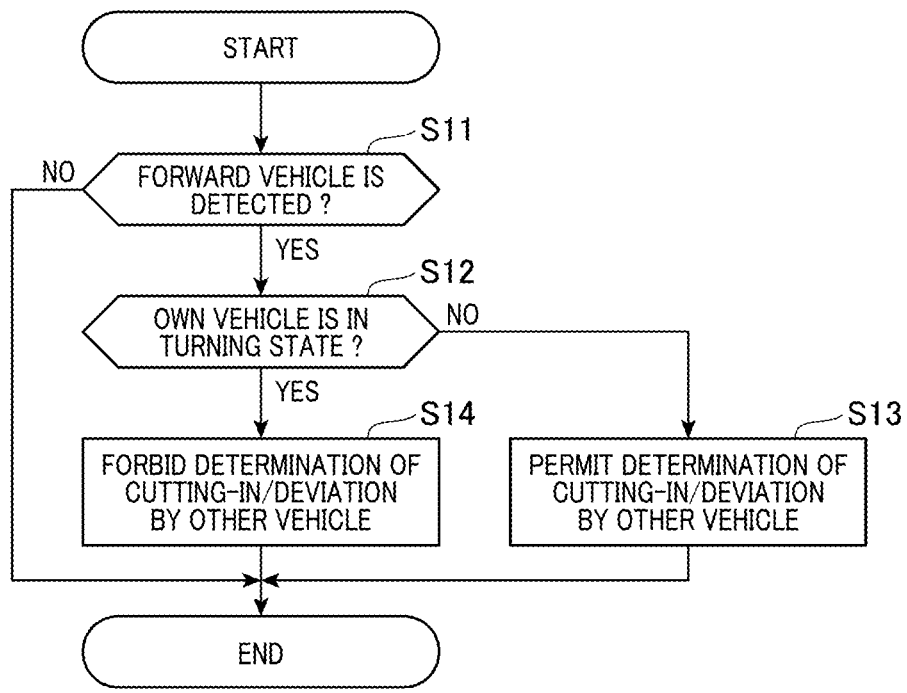
FIG. 5 is a flow chart illustrating a procedure of permission determination of the cutting-in determination and deviation determination of another vehicle.
Figure 6:
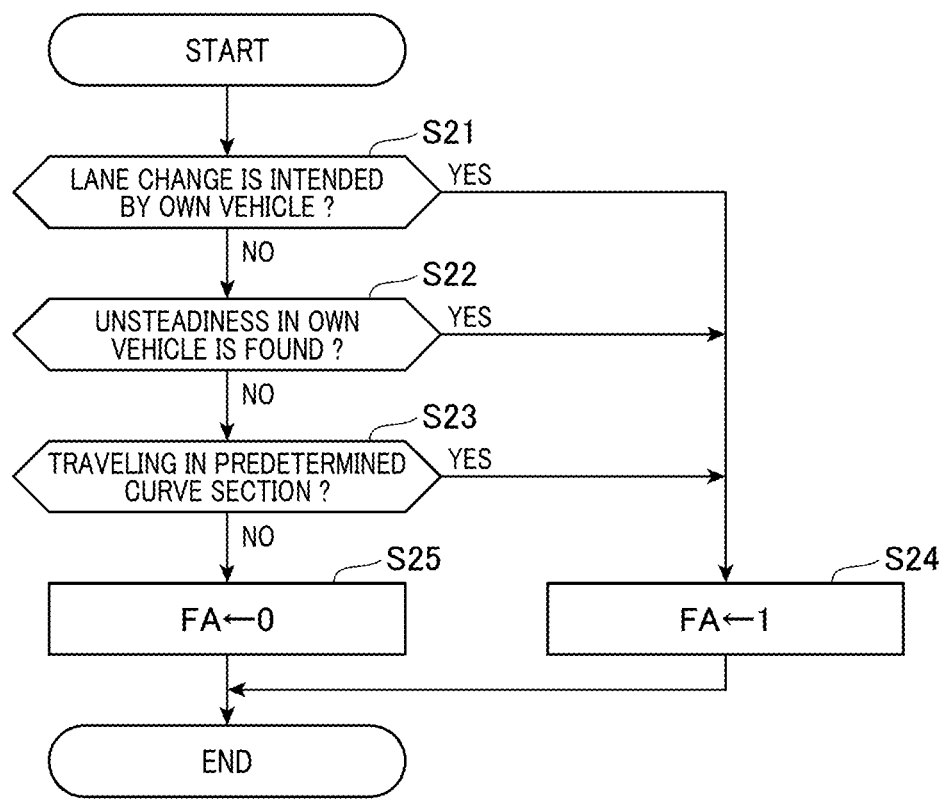
FIG. 6 is a flow chart illustrating a procedure of flag setting.

Next, the cutting-in determination and deviation determination of another vehicle executed in the cruise control device 10 according to this embodiment will be described with the use of the flow charts in FIG. 5 and FIG. 6. FIG. 5 is a flow chart illustrating a procedure of permission determination of the cutting-in determination and deviation determination of the other vehicle. FIG. 6 is a flow chart illustrating a procedure of flag setting for setting a determination flag of an own vehicle turning state. These processes are executed in a given cycle by the cutting-in/deviation determination unit 12 provided in the cruise control device 10 when the ACC switch 26 is turned on (when a vehicle-following control mode is executed).

As illustrated in FIG. 5, the cutting-in/deviation determination unit 12 determines whether or not the forward vehicle 51 has been detected by the object detecting means (step S11). In a process of step S11, the presence or absence of the forward vehicle 51 is determined targeting a fusion target. In addition, when there are a plurality of the forward vehicles 51, a vehicle to be a determination target of this time may be selected from among the plurality of forward vehicles 51.

When determining that the forward vehicle 51 is detected (the forward vehicle 51 is present) (step S11: YES), the cutting-in/deviation determination unit 12 proceeds to step S12. The cutting-in/deviation determination unit 12 determines whether or not the own vehicle 50 is in the predetermined own vehicle turning state (step S12). In a process of step S12, the own vehicle turning state of the own vehicle 50 is determined as follows. The cutting-in/deviation determination unit 12 acquires the determination flag of the own vehicle turning state FA that is set in a flag setting process shown in FIG. 6, which will be described later. When the determination flag FA is 0 (when FA=0), the cutting-in/deviation determination unit 12 determines (negative determination) that the own vehicle 50 is not in the predetermined own vehicle turning state. Otherwise, when the determination flag FA is 1 (when FA==1), the cutting-in/deviation determination unit 12 determines (affirmative determination) that the own vehicle 50 is in the predetermined own vehicle turning state. As stated above, the cutting-in/deviation determination unit 12 determines that the own vehicle 50 is in the predetermined own vehicle turning state if the own vehicle 50 is in a state before starting a turn (state before a turn) or in a state of turning (state after starting a turn).

As a result, when determining that the own vehicle 50 is not in the predetermined own vehicle turning state (step S12: NO), the cutting-in/deviation determination unit 12 proceeds to step S13. The cutting-in/deviation determination unit 12 permits performing of the cutting-in determination and deviation determination of another vehicle (step S13). Consequently, the cutting-in/deviation determination unit 12 performs the cutting-in determination and deviation determination of the other vehicle (performs the cutting-in determination and deviation determination process). On the other hand, when determining that the own vehicle 50 is in the predetermined own vehicle turning state (step S12: YES), the cutting-in/deviation determination unit 12 proceeds to step S14. The cutting-in/deviation determination unit 12 forbids performing of cutting-in determination and deviation determination of the other vehicle (step S14). Consequently, the cutting-in/deviation determination unit 12 does not perform the cutting-in determination and deviation determination of the other vehicle (does not perform the cutting-in determination and deviation determination process). In addition, when determining that the forward vehicle 51 is not detected (forward vehicle 51 is not present) (step S11: NO), the cutting-in/deviation determination unit 12 finishes this routine.

Next, a flag setting process for setting the determination flag of the own vehicle turning state FA shown in FIG. 6 will be described. As illustrated in FIG. 6, the cutting-in/deviation determination unit 12 determines whether or not the own vehicle 50 intends to change lane (step S21). In short, the cutting-in/deviation determination unit 12 determines whether or not the own vehicle 50 is about to change lane. As stated above, the cutting-in/deviation determination unit 12 functions as a change determination means determining whether or not the own vehicle 50 is about to change lane (whether or not the own vehicle 50 intends to change lane). In a process of step S21, the presence or absence of intention of lane change of the own vehicle 50 is determined on the basis of fulfillment or not of a predetermined lane change determination condition. In this embodiment, the following two conditions are mainly included as the predetermined lane change determination condition.

(1) A situation where it is predicted that the own vehicle 50 will change lane.

(2) A situation where a lane change is being performed at the present moment.

When at least one of the condition within these two conditions (1) and (2) is fulfilled, the cutting-in/deviation determination unit 12 determines that the own vehicle 50 intends to change lane (the own vehicle 50 is about to change lane) (affirmative determination).

In particular, in this embodiment, in order to determine fulfillment or not of the abovementioned two conditions (1) and (2), the following five sub-conditions are included as a detailed lane change determination condition.

<First determination condition> An operation signal is input such that an operating lever of a direction indicator provided in the own vehicle 50 is operated by a driver to an indication position in a left direction or right direction.

<Second determination condition> A crossing over degree of the white line 61 or an approaching degree of the white line 61 in the own vehicle 50 is a predetermined value (threshold value) or larger.

<Third determination condition> The moving speed (lateral moving speed) in the lateral direction of the own vehicle 50 is a predetermined value (threshold value) or greater.

<Fourth determination condition> A yaw rate (angular velocity in a turning direction) or an estimated R (curve radius of a predicted route) of the own vehicle 50 with respect to the white line 61 is a predetermined value (threshold value) or larger.

<Fifth determination condition> The amount of change of a steering angle of the own vehicle 50 is a predetermined value (threshold value) or larger. The cutting-in/deviation determination unit 12 determines that the own vehicle 50 intends to change lane when at least one determination condition within a plurality of these determination conditions is fulfilled.

As a result, when determining that the own vehicle 50 intends to change lane (the own vehicle 50 is about to change lane) (step S21: YES), the cutting-in/deviation determination unit 12 proceeds to step S24. The cutting-in/deviation determination unit 12 sets 1 to the determination flag of the own vehicle turning state FA (step S24). In short, when the own vehicle 50 intends to change lane (when the own vehicle 50 is about to change lane), the cutting-in/deviation determination unit 12 determines that the own vehicle 50 is in the predetermined own vehicle turning state. Otherwise, when determining that the own vehicle 50 does not intend to change lane (the own vehicle 50 is not about to change lane) (step S21: NO), the cutting-in/deviation determination unit 12 proceeds to step S22. The cutting-in/deviation determination unit 12 determines the presence or absence of unsteadiness of the own vehicle 50 (whether or not the traveling of the own vehicle 50 is unsteady) (step S22). As stated above, the cutting-in/deviation determination unit 12 functions as an unsteadiness determination means determining whether or not the traveling of the own vehicle 50 is unsteady. In the process of step S22, the unsteadiness degree of the own vehicle 50 is calculated, and when the calculated unsteadiness degree is a predetermined value (threshold value) or greater, it is determined that the traveling of the own vehicle 50 is unsteady (unsteadiness is found). In this embodiment, for example, an amount of change of a distance from the white line 61 to the own vehicle 50 (vehicle center axis 52 or vehicle side surface) is calculated as the unsteadiness degree of the own vehicle 50. In addition, the calculation method of the unsteadiness degree of the own vehicle 50 is not limited to this. For example, as other calculation method, an amplitude calculated on the basis of a maximum peak value and a minimum peak value in time series variation at a position in the lateral direction of the own vehicle 50 may be used as a calculated value of the unsteadiness degree of the own vehicle 50. In addition, an amount of change of a steering angle detected by the steering angle sensor 25 may be used as a calculated value of the unsteadiness degree of the own vehicle 50.

As a result, when determining that the traveling of the own vehicle 50 is unsteady (unsteadiness is found) (step S22: YES), the cutting-in/deviation determination unit 12 proceeds to step S24. The cutting-in/deviation determination unit 12 sets 1 to the determination flag of the own vehicle turning state FA (step S24). In short, when the traveling of the own vehicle 50 is unsteady (in case of unsteadiness found), the cutting-in/deviation determination unit 12 determines that the own vehicle 50 is in the predetermined own vehicle turning state. Otherwise, when determining that the traveling of the own vehicle 50 is not unsteady (unsteadiness is not found) (step S22: NO), the cutting-in/deviation determination unit 12 proceeds to step S23. The cutting-in/deviation determination unit 12 determines whether or not the own vehicle 50 is traveling in a predetermined curve section (step S23). In this embodiment, a predetermined section of a road, which is composed of at least one of a curved road and a curve entry road that is a straight road of a predetermined section before entering the curved road, is set as a predetermined curve section. Therefore, in this embodiment, when the own vehicle 50 is traveling on either one of the curved road or the curve entry road, it is determined that the traveling road is the predetermined curve section. As stated above, the cutting-in/deviation determination unit 12 functions as a curve determination means determining whether or not the own vehicle 50 is traveling in the predetermined curve section which is composed of at least one of the curved road and the curve entry road. In a process of step S23, it is determined whether the own vehicle 50 is traveling on the curved road on the basis of the following various information. The cutting-in/deviation determination unit 12 determines that the own vehicle 50 is traveling on the curved road on the basis of the estimated R of the own vehicle 50, a shape of a stationary roadside object detected by the object detecting means (for example, guard-rail, etc.), a moving locus of the forward vehicle 51, the recognition result of the white line 61 and the like. In addition, in the process of step S23, it is determined whether the own vehicle 50 is traveling on the curve entry road on the basis of the following various information. The cutting-in/deviation determination unit 12 determines that there is a curved road ahead of the own vehicle 50 on the basis of the shape of the stationary roadside object detected by the object detecting means, the moving locus of the forward vehicle 51, the recognition result of the white line 61, and the like. In this way, the cutting-in/deviation determination unit 12 determines that the own vehicle 50 is traveling on the curve entry road.

As a result, when determining that the own vehicle 50 is traveling in the predetermined curve section (step S23: YES), the cutting-in/deviation determination unit 12 proceeds to step S24. The cutting-in/deviation determination unit 12 sets 1 to the determination flag of the own vehicle turning state FA (step S24). In short, when the own vehicle 50 is traveling in the predetermined curve section, the cutting-in/deviation determination unit 12 determines that the own vehicle 50 is in the predetermined own vehicle turning state. Otherwise, when determining that the own vehicle 50 is not traveling in the predetermined curve section (step S23: NO), the cutting-in/deviation determination unit 12 proceeds to step S25. The cutting-in/deviation determination unit 12 sets 0 to the determination flag of the own vehicle turning state FA (step S25). In short, when the own vehicle 50 does not intend to change lane (is not about to change lane), the cutting-in/deviation determination unit 12 determines that the own vehicle 50 is not in the predetermined own vehicle turning state. In addition, when the traveling of the own vehicle 50 is not unsteady (in case of unsteadiness not found), the cutting-in/deviation determination unit 12 determines that the own vehicle 50 is not in the predetermined own vehicle turning state. In addition, when the own vehicle 50 is not traveling in the predetermined curve section, the cutting-in/deviation determination unit 12 determines that the own vehicle 50 is not in the predetermined own vehicle turning state.

As described above in detail, in the cruise control device 10 according to this embodiment, the following beneficial effect can be obtained.

The cruise control device 10 according to this embodiment is configured so as to determine permission of performing of cutting-in determination and deviation determination of the other vehicle (execution permission of a determination process) on the basis of a determination result of whether or not the own vehicle 50 is in the predetermined own vehicle turning state that is either one of a state before starting a turn or a state of turning. In a case where the own vehicle 50 is in the state of turning, if cutting-in determination and deviation determination of the other vehicle is performed on the basis of a position in the lateral direction of the forward vehicle 51, there is a risk that a movement of the forward vehicle 51 with respect to the own vehicle 50 cannot be accurately recognized. In such a case, it is considered that the forward vehicle 51 is erroneously determined to correspond to a cutting-in vehicle or a deviating vehicle. In addition, also with regard to a case where the own vehicle 50 is in a state before starting a turn, there is concern similar to the abovementioned case. In view of that point, by configuring in the abovementioned manner, the cruise control device 10 according to this embodiment can improve stability of selection/non-selection of a preceding vehicle that is to be a target of a vehicle-following control.

In particular, the cruise control device 10 according to this embodiment determines whether or not the own vehicle 50 intends to change lane (whether or not the own vehicle 50 is about the change lane). Furthermore, the cruise control device is configured so as to determine that the own vehicle 50 is in the predetermined own vehicle turning state when determining that there is an intention to change lane (the own vehicle 50 is about to change lane). When the own vehicle 50 changes lane, it is assumed that a relative position between the own vehicle 50 and the forward vehicle 51 changes and the movement of the forward vehicle 51 cannot be accurately recognized. Therefore, by configuring in the abovementioned manner, the cruise control device 10 according to this embodiment can suppress degradation in accuracy of selection/non-selection of a preceding vehicle that is to be a target of a vehicle-following control due to the lane change of the own vehicle 50.

The cruise control device 10 according to this embodiment determines whether or not the traveling of the own vehicle 50 is unsteady (the presence or absence of unsteadiness). Furthermore, the cruise control device 10 is configured so as to determine that the own vehicle 50 is in the predetermined own vehicle turning state when determining that the traveling of the own vehicle 50 is unsteady (unsteadiness is found). As with the case of a lane change, when the traveling of the own vehicle 50 is unsteady, it is assumed that the relative position between the own vehicle 50 and the forward vehicle 51 changes and the movement of the forward vehicle 51 cannot be accurately recognized. Therefore, by configuring in the abovementioned manner, the cruise control device 10 according to this embodiment can suppress degradation in accuracy of selection/non-selection of a preceding vehicle that is to be a target of a vehicle-following control due to the unsteadiness of the own vehicle 50.

The cruise control device 10 according to this embodiment is configured so as to determine that the own vehicle 50 is in the predetermined own vehicle turning state when determining that the own vehicle 50 is traveling in the predetermined curve section, and to forbid performing of cutting-in determination and deviation determination of another vehicle. In a curved road and a curve entry road that is a straight road of a predetermined section before entering the curved road, even when the own vehicle 50 and the forward vehicle 51 are traveling along with a shape of the white line 61, a relative position in the lateral direction of the forward vehicle 51 changes. In such a case, there is a risk that the forward vehicle 51 is erroneously determined to be a cutting-in vehicle or a deviating vehicle. Accordingly, the cruise control device 10 according to this embodiment is configured so as to forbid the performing of cutting-in determination and deviation determination of the other vehicle in a situation where such erroneous determination is possibly caused. As stated above, by configuring in the abovementioned manner, the cruise control device 10 according to this embodiment can improve stability of selection/non-selection of a preceding vehicle that is to be a target of a vehicle-following control due to the traveling site of the own vehicle 50.

For example, the cruise control device 10 performs cutting-in determination and deviation determination of another vehicle (performs a determination process) on the basis of an offset position in the lateral direction Rx calculated as a relative position with respect to the own vehicle 50 in a vehicle width direction of the forward vehicle 51. In this embodiment, to such cruise control device 10, a configuration in which permission of performing of cutting-in determination and deviation determination of another vehicle (execution permission of a determination process) is determined on the basis of a determination result of the predetermined own vehicle turning state in the own vehicle 50 has been applied. In a configuration in which the offset position Rx is used as the determination parameter of the cutting-in determination and deviation determination of another vehicle, when the own vehicle 50 is in the predetermined own vehicle turning state, the state largely affects calculation accuracy of a position in the lateral direction of the forward vehicle 51, and the movement of the forward vehicle 51 cannot be accurately recognized. Therefore, in the configuration in which the offset position Rx is used as the determination parameter of cutting-in determination and deviation determination of the other vehicle, a probability of erroneous determination regarding whether or not the forward vehicle 51 corresponds to a cutting-in vehicle or a deviating vehicle becomes higher. Accordingly, in the cruise control device 10 according to this embodiment, a configuration in which permission of performing of cutting-in determination and deviation determination of the other vehicle is determined is applied to a configuration in which the offset position Rx is used as the determination parameter. As stated above, by configuring in the abovementioned manner, the cruise control device 10 according to this embodiment can obtain more suitably an effect such that stability of selection/non-selection of a preceding vehicle that is to be a target of a vehicle-following control is improved.

Other Embodiments

The cruise control device 10 of this disclosure is not limited to the abovementioned embodiment, and may be implemented as follows for example.

The cutting-in/deviation determination unit 12 according to the abovementioned embodiment functions as a lateral position calculating means calculating an offset position in the lateral direction Rx as a relative position with respect to the own vehicle 50 in a vehicle width direction of the forward vehicle 51. Furthermore, the cutting-in/deviation determination unit 12 is configured so as to perform the cutting-in determination and deviation determination of another vehicle with the use of the offset position Rx as the determination parameter, but the configuration is not limited to this. The configuration for functioning as the lateral position calculating means may be other than the abovementioned configuration. In addition, the determination parameter used for the cutting-in determination and deviation determination of the other vehicle may be other than the abovementioned parameter. For example, in other embodiments, the cutting-in/deviation determination unit 12 functions as a lateral position calculating means calculating a relative position with respect to the white line 61 in the vehicle width direction (lateral direction) of the forward vehicle 51. Furthermore, the cutting-in/deviation determination unit 12 performs the cutting-in determination and deviation determination of the other vehicle with the use of the relative position with respect to the white line 61 in a vehicle width direction of the forward vehicle 51 as the determination parameter. However, in the cutting-in determination and deviation determination of another vehicle using the white line 61, when the own vehicle 50 is in a predetermined own vehicle turning state, the movement of the forward vehicle 51 cannot be accurately recognized. Therefore, when the own vehicle 50 is in the predetermined own vehicle turning state, there is a risk that accuracy in determination of a cutting-in vehicle and a deviating vehicle relative to the forward vehicle 51 is degraded. Therefore, with a view to preventing cutting-in determination and deviation determination of another vehicle in a situation that easily causes an erroneous determination, other embodiments may be configured as follows. In particular, in the cutting-in determination and deviation determination of another vehicle using the white line 61, when the own vehicle 50 is in the predetermined own vehicle turning state, a configuration for forbidding the cutting-in determination and deviation determination of the other vehicle may be applied.

The cutting-in determination and deviation determination of another vehicle using the white line 61 may be performed as follows. For example, in other embodiments, the cutting-in/deviation determination unit 12 calculates an approaching degree or a crossing over degree of the forward vehicle 51 with respect to the white line 61 as a parameter indicating the relative position with respect to the white line 61 in the vehicle width direction (lateral direction) of the forward vehicle 51. Furthermore, the cutting-in/deviation determination unit 12 performs the cutting-in determination and deviation determination of the other vehicle on the basis of the calculated approaching degree or crossing over degree. In addition, the approaching degree or crossing over degree of the forward vehicle 51 with respect to the white line 61 is, for example, the amount of crossing over the white line 61 of the own lane 63, on which the own vehicle 50 is traveling, by the forward vehicle 51 traveling on the adjacent lane 64 (white line cross over amount). In this case, when the white line cross over amount is on the rise (the forward vehicle 51 is approaching to the own vehicle 50) and the white line cross over amount is a predetermined value (threshold value) or larger as the time elapses, the cutting-in/deviation determination unit 12 determines the forward vehicle 51 to be a cutting-in vehicle. Otherwise, when the white line cross over amount is on the decrease (while forward vehicle 51 is moving away from the own vehicle 50) and the white line cross over amount is smaller than a predetermined value (threshold value) as the time elapses, the cutting-in/deviation determination unit 12 determines the forward vehicle 51 to be a deviating vehicle.

In the abovementioned embodiment, the offset position Rx and the predetermined value (threshold value) are compared, and on the basis of the comparison result, the cutting-in determination and deviation determination of another vehicle is performed, but the configuration is not limited to this. For example, in other embodiments, a predictive value at a position in the lateral direction of the forward vehicle 51 is calculated in accordance with a moving speed in a lane lateral direction (lateral moving speed) of the forward vehicle 51. Furthermore, in other embodiments, the calculated predictive value and a predetermined value (threshold value) are compared, and on the basis of the comparison result, the cutting-in determination and deviation determination of another vehicle are performed. In other embodiments, a configuration for determining permission of performing of the cutting-in determination and deviation determination of another vehicle may be applied to such configuration.

For example, the cutting-in/deviation determination unit 12 according to the abovementioned embodiment functions as a first determination means performing the cutting-in determination and deviation determination of another vehicle with the use of a position coordinate with respect to the white line 61 in an X-axis direction of the forward vehicle 51 as the determination parameter. In addition, the cutting-in/deviation determination unit 12 functions as a second determination means performing the cutting-in determination and deviation determination of another vehicle with the use of an offset position in the lateral direction Rx that is a position coordinate based on the own vehicle 50 in the X-axis direction of the forward vehicle 51 as the determination parameter. In such a case, in other embodiments, a configuration for determining permission of performing of cutting-in determination and deviation determination of another vehicle may be applied to the configuration for performing determination by switching the first determination means and the second determination means. In this case, when it is determined that the own vehicle 50 is in a predetermined own vehicle turning state, a configuration for forbidding the cutting-in determination and deviation determination of the other vehicle by the first and second determination means may be employed. In addition, a configuration for forbidding determination by either one of the first determination means or the second determination means may be employed.

In the abovementioned embodiment, a road which is composed of a curved road and a curve entry road is set as a predetermined section, and it is determined whether or not the own vehicle 50 is traveling on either one of the road sections (predetermined curve section) within the curved road or the curve entry road. Furthermore, in the abovementioned embodiment, when it is determined that the own vehicle 50 is traveling in the predetermined curve section, the cutting-in determination and deviation determination of another vehicle is forbidden, but the configuration is not limited to this. For example, in other embodiments, the configuration may be modified as follows. In particular, in other embodiments, only the curved road may set as the predetermined curve section, and whether or not the own vehicle 50 is traveling on the curved road is determined, and when it is determined that the own vehicle 50 is traveling on the curved road, the cutting-in determination and deviation determination of another vehicle may be forbidden. Alternatively, in other embodiments, only the curve entry road is set as the predetermined curve section, and whether or not the own vehicle 50 is traveling on the curve entry road is determined, and when it is determined that the own vehicle 50 is traveling on the curve entry road, the cutting-in determination and deviation determination of another vehicle may be forbidden.

The cutting-in/deviation determination unit 12 according to the abovementioned embodiment functions as a turn determination means determining whether or not the own vehicle 50 is in the predetermined own vehicle turning state. Furthermore, the cutting-in/deviation determination unit 12 is configured so as to determine that the own vehicle 50 is in the predetermined own vehicle turning state when the own vehicle 50 is in either one of a state before starting a turn or a state of turning, but the configuration is not limited to this. For example, in other embodiments, only a state before the own vehicle 50 starts a turn may be used as the predetermined own vehicle turning state. Alternatively, in other embodiments, a state where the own vehicle 50 is turning may be used as the predetermined own vehicle turning state.

In the abovementioned embodiment, the following three sub-conditions are provided as a determination condition for determining whether or not the own vehicle 50 is in the predetermined own vehicle turning state. In particular, the first determination condition is that it is determined that the own vehicle 50 intends to change lane (the own vehicle 50 is about to change lane). The second determination condition is that it is determined that unsteadiness of the own vehicle 50 is found (the traveling of the own vehicle 50 is unsteady). The third determination condition is that it is determined that the own vehicle 50 is traveling in the predetermined curve section. Furthermore, in the abovementioned embodiment, when at least one of these three determination conditions is fulfilled, it is determined that the own vehicle 50 is in the predetermined own vehicle turning state, and performing of cutting-in determination and deviation determination of another vehicle is forbidden, but the configuration is not limited to this. For example, in other embodiments, the configuration may be modified as follows. In particular, in other embodiments, one of the abovementioned three determination conditions may be set as the determination condition for determining whether or not the own vehicle 50 is in the predetermined own vehicle turning state. Alternatively, in other embodiments, two of the abovementioned three determination conditions may be set as the determination condition for determining whether or not the own vehicle 50 is in the predetermined own vehicle turning state.

In the abovementioned embodiment, the cutting-in determination and deviation determination of another vehicle are performed targeting a fusion target, but the configuration is not limited to this. For example, other embodiments may be configured so as to perform the cutting-in determination and deviation determination of the other vehicle, targeting either one of the target detected by the imaging device 21 or the target detected by the radar device 22.

In the abovementioned embodiment, the imaging device 21 and the radar device 22 are provided as the object detecting means, but the configuration is not limited to this. For example, in other embodiments, a sonar for detecting an object with the use of ultrasonic waves for transmitting waves may be provided as an alternative to the radar device 22. In addition, in other embodiments, the technique of this disclosure may be applied to a system in which only the imaging device 21 is provided or a system in which only the radar device 22 is provided as the object detecting means.

REFERENCE SIGNS LIST

10 . . . Cruise control device, 11 . . . White line recognition unit, 12 . . . Cutting-in/deviation determination unit, 13 . . . Preceding vehicle selection unit, 14 . . . Control target value computation unit, 21 . . . Imaging device, 22 . . . Radar device, 23 . . . Yaw rate sensor, 31 . . . Engine ECU, 32 . . . Brake ECU

The invention claimed is:

1. A vehicle cruise control device comprising:
a lateral position calculating means calculating a lateral position that is a position in a vehicle width direction of a forward vehicle traveling ahead of an own vehicle;
a vehicle determination means performing cutting-in determination and deviation determination with regard to the forward vehicle, in which it is determined whether the forward vehicle traveling on an adjacent lane adjacent to an own lane that is a travel lane of the own vehicle is a cutting-in vehicle that cuts into the own lane, and determined whether the forward vehicle traveling on the own lane is a deviating vehicle that deviates from the own lane, on the basis of the lateral position calculated by the lateral position calculating means;
a turn determination means determining whether or not the own vehicle is in a predetermined own vehicle turning state that is either one of a state before starting a turn or a state of turning;
a permission determining means determining permission of performing of cutting-in determination and deviation determination on the basis of a determination result by the turn determination means; and
a change determination means determining whether or not the own vehicle is about to change lanes, wherein
the turn determination means determines that the own vehicle is in the own vehicle turning state when the change determination means determines that the own vehicle is about to change lanes.

2. The vehicle cruise control device according to claim 1 comprising a curve determination means determining whether or not the own vehicle is traveling in a curve section which is composed of at least one of a curved road and a curve entry road that is a predetermined section before entering the curved road, wherein
the turn determination means determines that the own vehicle is in the own vehicle turning state when the curve determination means determines that the own vehicle is traveling in the curve section.

3. A cruise control method by a vehicle cruise control device, the method comprising:
a lateral position calculation step of calculating a lateral position that is a position in a vehicle width direction of a forward vehicle traveling ahead of an own vehicle;
a vehicle determination step of performing cutting-in determination and deviation determination with regard to the forward vehicle, in which it is determined whether the forward vehicle traveling on an adjacent lane adjacent to an own lane that is a traveling lane of the own vehicle is a cutting-in vehicle that cuts into the own lane, and determined whether the forward vehicle traveling on the own lane is a deviating vehicle that deviates from the own lane, on the basis of the lateral position calculated by the lateral position calculation step;
a turn determination step of determining whether or not the own vehicle is in a predetermined own vehicle turning state that is either one of a state before starting a turn or a state of turning;
a permission determination step of determining permission of performing of cutting-in determination and deviation determination on the basis of a determination result by the turn determination step; and
a change determination step of determining whether or not the own vehicle is about to change lanes, wherein
in the turn determination step, it is determined that the own vehicle is in the own vehicle turning state when it is determined that the own vehicle is about to change lanes.

4. A vehicle cruise control device comprising:
a memory;
a processor communicable to the memory; and
a set of computer-executable instructions stored on the memory that cause the processor to implement:
calculating a lateral position that is a position in a vehicle width direction of a forward vehicle traveling ahead of an own vehicle;
performing cutting-in determination and deviation determination with regard to the forward vehicle, in which it is determined whether the forward vehicle traveling on an adjacent lane adjacent to an own lane that is a travel lane of the own vehicle is a cutting-in vehicle that cuts into the own lane, and determined whether the forward vehicle traveling on the own lane is a deviating vehicle that deviates from the own lane, on the basis of the lateral position calculated;
determining whether or not the own vehicle is in a predetermined own vehicle turning state that is either one of a state before starting a turn or a state of turning;
determining permission of performing of cutting-in determination and deviation determination on the basis of a determination result; and
determining whether or not the own vehicle is about to change lanes, wherein
the own vehicle is determined to be in the own vehicle turning state when it is determined that the own vehicle is about to change lanes.

5. A vehicle cruise control device comprising:
a lateral position calculating means calculating a lateral position that is a position in a vehicle width direction of a forward vehicle traveling ahead of an own vehicle;
a vehicle determination means performing cutting-in determination and deviation determination with regard to the forward vehicle, in which it is determined whether the forward vehicle traveling on an adjacent lane adjacent to an own lane that is a travel lane of the own vehicle is a cutting-in vehicle that cuts into the own lane, and determined whether the forward vehicle traveling on the own lane is a deviating vehicle that deviates from the own lane, on the basis of the lateral position calculated by the lateral position calculating means;
a turn determination means determining whether or not the own vehicle is in a predetermined own vehicle turning state that is either one of a state before starting a turn or a state of turning;
a permission determining means determining permission of performing of cutting-in determination and deviation determination on the basis of a determination result by the turn determination means; and an unsteadiness determination means determining whether or not traveling of the own vehicle is unsteady, wherein the turn determination means determines that the own vehicle is in the own vehicle turning state when the unsteadiness determination means determines that the traveling of the own vehicle is unsteady.

6. The vehicle cruise control device according to claim 5 comprising a curve determination means determining whether or not the own vehicle is traveling in a curve section which is composed of at least one of a curved road and a curve entry road that is a predetermined section before entering the curved road, wherein the turn determination means determines that the own vehicle is in the own vehicle turning state when the curve determination means determines that the own vehicle is traveling in the curve section.

7. A cruise control method by a vehicle cruise control device, the method comprising:

a lateral position calculation step of calculating a lateral position that is a position in a vehicle width direction of a forward vehicle traveling ahead of an own vehicle;

a vehicle determination step of performing cutting-in determination and deviation determination with regard to the forward vehicle, in which it is determined whether the forward vehicle traveling on an adjacent lane adjacent to an own lane that is a traveling lane of the own vehicle is a cutting-in vehicle that cuts into the own lane, and determined whether the forward vehicle traveling on the own lane is a deviating vehicle that deviates from the own lane, on the basis of the lateral position calculated by the lateral position calculation step;

a turn determination step of determining whether or not the own vehicle is in a predetermined own vehicle turning state that is either one of a state before starting a turn or a state of turning;

a permission determination step of determining permission of performing of cutting-in determination and deviation determination on the basis of a determination result by the turn determination step; and an unsteadiness determination step of determining whether or not traveling of the own vehicle is unsteady, wherein in the turn determination step, it is determined that the own vehicle is in the own vehicle turning state when it is determined that the traveling of the own vehicle is unsteady.

8. A vehicle cruise control device comprising:

a memory;

a processor communicable to the memory; and a set of computer-executable instructions stored on the memory that cause the processor to implement:

calculating a lateral position that is a position in a vehicle width direction of a forward vehicle traveling ahead of an own vehicle;

performing cutting-in determination and deviation determination with regard to the forward vehicle, in which it is determined whether the forward vehicle traveling on an adjacent lane adjacent to an own lane that is a travel lane of the own vehicle is a cutting-in vehicle that cuts into the own lane, and determined whether the forward vehicle traveling on the own lane is a deviating vehicle that deviates from the own lane, on the basis of the lateral position calculated;

determining whether or not the own vehicle is in a predetermined own vehicle turning state that is either one of a state before starting a turn or a state of turning; and determining permission of performing of cutting-in determination and deviation determination on the basis of a determination result, wherein the own vehicle is determined to be in the own vehicle turning state based at least in part on a determination that the own vehicle is in an unsteady state.

* * * * *